July 7, 1959 R. P. MURPHY 2,894,255

TWO-WAY PHOTOELECTRIC TRANSLATOR

Filed Nov. 29, 1954 3 Sheets-Sheet 1

INVENTOR
R. P. MURPHY
BY William F. Simpson
ATTORNEY

July 7, 1959 R. P. MURPHY 2,894,255

TWO-WAY PHOTOELECTRIC TRANSLATOR

Filed Nov. 29, 1954 3 Sheets-Sheet 2

INVENTOR
R. P. MURPHY
BY William F. Simpson
ATTORNEY

TWO-WAY PHOTOELECTRIC TRANSLATOR

Filed Nov. 29, 1954 3 Sheets-Sheet 3

INVENTOR
R. P. MURPHY
BY William F. Simpson
ATTORNEY

United States Patent Office 2,894,255

Patented July 7, 1959

2,894,255

TWO-WAY PHOTOELECTRIC TRANSLATOR

Richard P. Murphy, Nyack, N.Y., assignor to Bell Telephone Laboratories, Incorporated, New York, N.Y., a corporation of New York Application November 29, 1954, Serial No. 471,819

6 Claims. (Cl. 340—347)

This invention relates to translator and cross-reference devices and more particularly to such devices which provide for high-speed two-way translations.

One general object of this invention is to provide a simplified electronic translator or cross-reference system which can be employed for a wide variety of services and which is capable of operating at high speed. For example, in stock control and inventory problems, it is sometimes desirable to refer to an item by a piece-part number or designation and at other times desirable to refer to the same item by an inventory or stock control number. The translator in accordance with this invention may be used to determine readily and rapidly either of these numbers from the other. Another example is where it is desirable to refer to an item by catalog number at times and at other times by any one of a plurality of different numbers such as an invoice number, location number, suppliers' information, etc. A translator in accordance with this invention also finds use in communication switching systems where it is sometimes necessary or desirable to refer to subscribers' lines by means of a subscriber directory number and at other times to refer to the subscriber line in terms of its location on a switching frame, switch, etc. Translators in accordance with this invention may be employed to determine either of these numbers if the other is known.

By way of example, a specific embodiment of the translator is described herein which has been designed for use in the number group circuit of a crossbar telephone machine switching system of the type described in Patent 2,585,904 which issued to A. J. Busch on February 19, 1952. The called subscriber's directory number as dialed by the calling subscriber is stored in an originating register and later transferred to a marker circuit. The marker circuit then consults a number group circuit which takes the dialed number, which is the directory number of the called subscriber's line, and translates this number into other numbers or symbols designating the actual position on the frame and upon a switch in that frame of the subscriber's line so that the marker may establish a connection to the desired subscriber's line under control of the designation of the location of the line in the switching office.

It is, therefore, another object of the present invention to provide an improved high-speed two-way or bilateral translating device which may be utilized to cross-reference two sets of information either arranged in accordance with some logical function or in an arbitrary manner.

A feature of the present invention resides in the provision of a translator for use in local or tandem telephone offices which has sufficient speed to handle all calls on substantially a one-at-a-time basis in order to avoid duplication of equipment and the use of expensive connecting equipment.

Still another object of the present invention is to allow the translation information to be readily changed without the use of wire cross-connections.

A still further object of the present invention is to permit simultaneous translations, one in each direction, between two or more numbers from any one to any other with the use of the same information medium.

In the specific embodiment disclosed herein, photoelectric means are utilized to read the information which is perforated on a continuous tape. The tape is perforated with one set of information arranged longitudinally along one side and another set arranged longitudinally along the other, each item in one set being paired with an item in the other set. Each of the two sets of information may be in an arbitrary or random order as long as the items remain paired. When a translation is required from an item in one set to an item in the other, the tape information in the first set is compared in a matching circuit with the input information indicating the item of information that is required to be translated. When the item in the first set and the input match, a circuit associated with the second set is enabled to read and register the associated item in the second set.

Another feature of the present invention pertains to the provision of duplicate components to facilitate standardization. The circuits or components utilized for making a translation in one direction are similar to those utilized for making a translation in the other.

A further feature of the present invention resides in the provision of synchronizing means for providing an indication of when a complete information frame of the tape is in position adjacent the reading heads.

Further objects, features and advantages will become apparent to those skilled in the art upon consideration of the following description and drawings wherein.

*General description*

Figures 1, 2, 3:
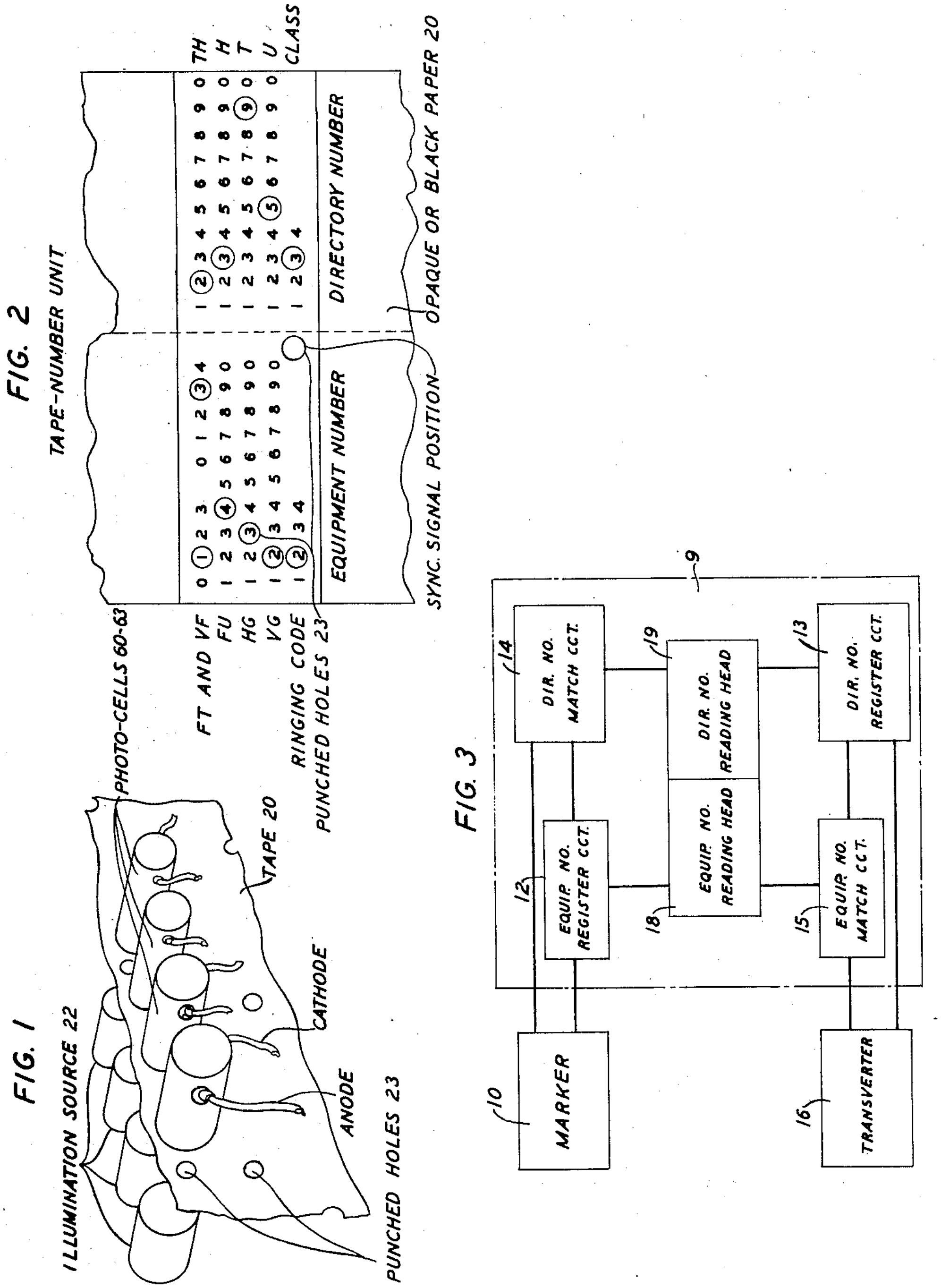
Fig. 1 is a fragmentary pictorial view of the photoelectric means and tape utilized in the illustrative embodiment of the invention.
Fig. 2 illustrates a portion of the tape utilized in the illustrative embodiment of the invention.
Fig. 3 is a box or functional diagram of a system illustrative of the present invention.

Referring to Fig. 3, the scanning type translator 9 is described as being part of a crossbar telephone central office of the type described in the Patent 2,585,904 which issued to A. J. Busch on February 19, 1952. When such crossbar systems are arranged for Automatic Message Accounting of the type described in the Patent 2,688,658 which issued to Carpenter-Collis on September 7, 1954, two similar translating processes take place in servicing a call; one is directory number identification of the calling subscriber and the other is the location of a called subscriber's line on the primary line link frames, or equipment number determination. In other words, it is necessary, in setting up a local call, at one time to translate an equipment number into a directory number and at another time, for the same call, to translate a directory number into an equipment number. The translator 9 performs these bilateral translations and cross-references the two sets of information, one set of which may be arranged in any desired or arbitrary or random order on a single information medium.

The translator 9 is comprised of essentially three functional sections; the information medium and reading heads 18 and 19; the common circuits for making the translation in one direction; and the common circuits for making the translation in the other direction.

In the illustrated embodiment of the present invention, the information medium is an opaque paper tape 20 shown particularly in Figs. 1 and 2. The digital information is recorded as punched holes 23 and is longitudinally arranged, as shown in Fig. 2, with the equipment number on the left and the directory number on the right. The tape 20 is a closed or continuous tape and is continuously rotated between the illuminating sources 22 and the photocells 60 through 63 etc. The photocells 60 through 63 etc. are arranged in two banks which form the reading heads 18 and 19 shown in Fig. 3. The sources 22 and photocells 60 through 63 etc. may be staggered to accommodate a narrower tape width.

The common circuits for making a translation from directory number to equipment number include the directory number matching circuit 14, the equipment number register circuit 12 and the reading heads 18 and 19. The common circuits utilized to make a translation in the other direction are the input equipment number matching circuit 15, the output number or directory number register circuit 13 and the reading heads 18 and 19. Each of the matching circuits 14 and 15 has two sets of input leads; one set is the input to the translator from the marker 10 or the transverter 16 and the other set is respectively from the reading heads 19 and 18. There is also one output lead from each matching circuit 14 and 15 which is connected respectively to the associated register circuit 12 or 13 and functions as a register operate lead.

Each of the output registers 12 and 13 has input lead from the reading heads 18 and 19, respectively, and an operate lead from its associated matching circuit. There is one set of output leads from the register circuits 12 and 13 which provides the output information from the translator 9.

In automatic message accounting, in addition to timing and recording the called subscriber's number on a call for which a charge is to be made, it is necessary to provide the directory number of the calling subscriber and whether he is served by a private line, a party line or a P.B.X trunk. In addition to the directory number, the calling subscriber's class of service is necessary in order to have complete information as to how he should be charged. The class of service may be obtained at the same time and in a similar manner as the directory number. The class of service information is digital information and therefore may be treated in the same manner as a directory number digit. In the establishment of a call, when the switching system has progressed to the point where it is desired to identify the calling subscriber and record his directory number, transverter 16 will obtain access to the translator 9 and more specifically to the input terminals connected to the equipment number matching circuit 15. The transverter 16 thereupon furnishes the equipment number of the calling line to the matching circuit 15 in the translator 9. When the matching circuit 15 receives the equipment number it is energized to start a search for the equipment number location on tape 20. The equipment number is located by the matching circuit 15 on the tape 20 by matching the information read from the tape 20 with that from the transverter 16. At the instant the match is obtained, a signal is provided from the matching circuit 15 to the register circuit 13 to cause the reading head 19 to read and the register circuit 13 to register the associated directory number from the tape 20. The associated directory number is the translation of the input-equipment number. The register circuit 13 passes the required translation back to the transverter 16 to complete the translation. Each transverter 16 in the central office may have an individual high-speed register circuit 13, as is hereinafter described, in order to reduce the holding time of the common equipment comprising the reading heads 18 and 19 and the matching circuit 15.

The operation of the translator 9 for party lines is the same as for private lines except that the party station number is provided as part of the input information along with the equipment number. For a two-party line, for example, the calling subscriber's equipment number will appear twice on the left side of the tape 20 and each will be accompanied by a different station number. The translator 9, in hunting for the wanted directory number, will pick out the correct one by means of the information given by the operated station number. The operation, therefore, of translator 9 is the same as the operation in reference to a private line. Similarly, each group of P.B.X trunks is assigned a directory or account number which appears opposite all equipment numbers on the tape 20 for that P.B.X group. The procedure for identification is the same as for private lines except that, irrespective of which trunk in a P.B.X group is identified, the same directory or account number will be recorded and charges made thereto.

A reverse direction translation is effected when it is desired to obtain the equipment number of a called subscriber when furnished with his directory number by the marker 10. The same tape 20 and reading heads 18 and 19 are utilized as for the translation from equipment to directory number.

The marker 10 furnishes the directory number to the directory number matching circuit 14 which proceeds to locate it on the tape 20 by matching the input with the readings from the reading head 19. When a match is achieved, the matching circuit 14 causes the register circuit 12 to register the reading from the reading head 18. The register circuit 12 thereupon passes the information, which is the required translation, back to the marker 10. There can be several register circuits 12, one for each marker 10, as is hereinafter described in the detailed circuit description, in order to reduce the holding time of the translator 9.

For the number group function, the operation of the translator 9 for a party line is similar to that for a private line except that upon reading the equipment number from the tape 20 passing adjacent, the reading head 18 the party station number information associated with the equipment number at that point is utilized to indicate which ringing code should be applied to the line in order to signal the desired subscriber. The illustrative example of tape 20 shown in Fig. 2 has provision for indicating the ringing code.

As described above for a P.B.X trunk, the same directory number appears opposite the equipment number on the tape 20 for a specific P.B.X group. The equipment number of the account or directory number will be located by a proper indication on the tape 20. For example, one hole position, not shown, on the tape 20 can be utilized adjacent one of the directory numbers to indicate P.B.X group account equipment number trunks. This equipment number is returned to the marker 10 which then obtains an idle trunk in the P.B.X group by use of the conventional method well known in the art.

A translation request by the marker 10 and by the transverter 16 may be simultaneously handled by the translator 9. If a plurality of markers or transverters are utilized, they are connected in a lockout or preference arrangement, as described for example in the above-identified patent to A. J. Busch, so that only one marker and one transverter is served at a time.

*Detailed description*

Figure 4:
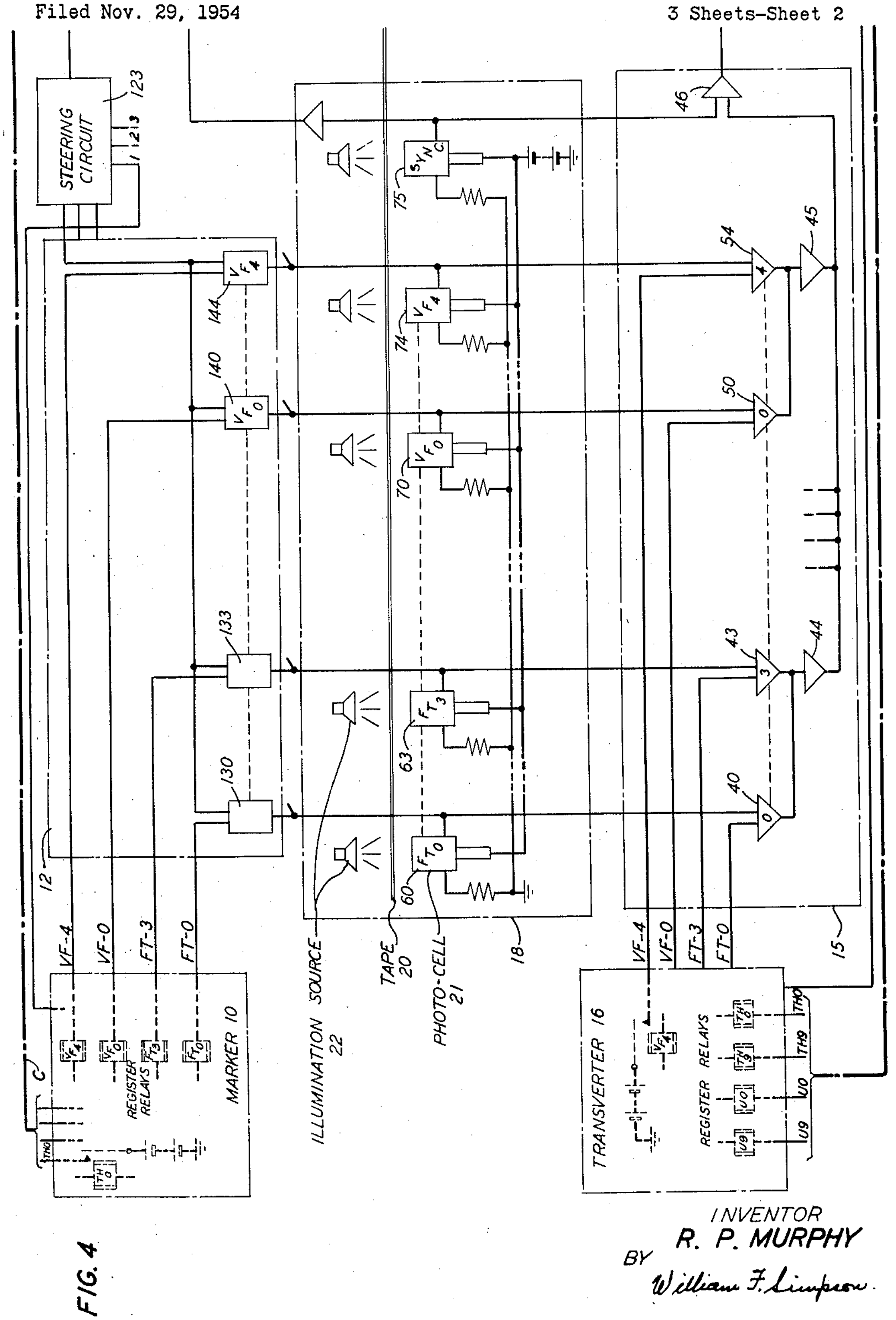
Figs. 4 and 5, with Fig. 5 arranged to the right of Fig. 4, are a detailed box or functional diagram of a translator constructed in accordance with the present invention.

The translator 9 is described as part of a crossbar telephone central office which includes automatic message accounting. In the crossbar system, the transverter 16, which controls the automatic message accounting and translator circuits, is furnished at some stage of operation with the subscriber's equipment number and party station number and requires the corresponding directory number to complete the message accounting. When the translation is required, potentials are supplied by the transverter 16 to selected ones of a plurality of input leads to translator 9 to provide the necessary digital information for transferring the equipment number and party station number to the translator 9, shown in detail in Figs. 4 and 5 when arranged with Fig. 5 to the right. With the equipment numbers on tape 20 being as shown in Fig. 2, there are 43 input leads from the transverter 16 which are designated VF0–4, FT0–3, FU0–9, HG0–9, VG0–9 and RG0–3. Only leads VF4, VF0, FT3 and FT0 are shown in Fig. 4. Each of the input leads from the transverter 16 terminates in the matching circuit 15 as one of two inputs to one of the 43 coincidence amplifiers or "and" circuits 40 through 43 and 50 through 54, etc. A coincidence amplifier is one that requires a balanced input, or two inputs in order to provide an output. Such amplifiers are well known in the art exemplified by the text "The Design of Switching Circuits" by W. Keister et al. Each of the coincidence amplifiers, 40 through 43 and 50 through 54, etc., also has an input from the reading head 18.

The reading head 18 is in the preferred embodiment of the present invention of the photoelectric type and tape 20, as described above, is an opaque paper with punched holes representing the recorded information. The reading head 18 comprises forty-four photoelectric cells 60 to 63, 70 to 74, 75, etc.; forty-three of which are connected respectively to the forty-three coincidence amplifiers 40—43 and 50—54, etc. and one of which, 75, is a synchronizing photocell which is hereinafter described. The forty-three photoelectric cells 60 through 63, 70 through 74, etc. change the potentials upon the input leads connected to the matching circuit 15 in accordance with the equipment numbers punched in the tape 20. For each equipment number, seven photocells, including the synchronizing photocell 75, are energized as there are six digital indications, as shown in Fig. 2, which are punched on the tape 20. The potentials provided from the transverter 16 balance the input to selected ones of the coincidence amplifiers 40 to 43, 50 to 54, etc. when these amplifiers are also provided over the other set of leads from the head 18 with a change in potential or a hole indication potential condition. For an equipment number, as shown in Fig. 2, a balanced input is provided to the amplifiers 41 and 53 as the FT digit is 1 and the VF digit is 3.

The outputs of each digital group of coincidence amplifiers, such as 40 through 43 or 50 through 54, are multipled respectively to one of the six amplifiers 44, 45, etc. The outputs of the six amplifiers 44, 45, etc. are multipled together and connected as an input to the coincidence amplifier 46. The other input to the coincidence amplifier 46 is from the synchronizing photocell 75, described above, which provides an indication or synchronizing signal for each equipment number.

A signal input to the coincidence amplifier 46 from the coincidence amplifiers 40 through 43, 50 through 54, etc. appears only when there is a complete match of the information supplied by the transverter 16 with the information supplied from the tape 20 through the reading head 18. A signal is present from the synchronizing photocell 75 each time an equipment number on tape 20 is in reading position. The photocells 60 to 63, 70 to 74, 75, etc. are positioned so that the synchronizing signal to the amplifier 46 occurs simultaneously with the signal from amplifiers 44, 45, etc. due to a match in the amplifiers 40 to 43, 50 to 54, etc. When both of these signals appear simultaneously as inputs of the amplifier 46, an output indication is provided through the steering circuit 47 to the register circuit 13.

Each of the amplifiers 44, 45, etc. normally provides an inhibiting potential to the amplifier 46. Even if five of the six amplifiers 44, 45, etc. are energized the sixth provides sufficient inhibiting potential to the amplifier 46. The amplifier 46, for example, may comprise a vacuum tube and each of the normal amplifiers 44, 45, etc. may provide a negative inhibiting potential to the control grid thereof. Such circuits, which are essentially "and" circuits, are well known in the art.

As described above, there may be a number of transverters 16. If a number of transverters are utilized, a register circuit 13 may be provided for each transverter in order to decrease the holding time of the common equipment in the translator 9. The output from the matching circuit 15 passes through the steering circuit 47 instead of directly to the register circuit 13. The steering circuit 47 is conditioned by the transverter 16 which is controlling the identification and has requested the translation to steer the operate pulse to its associated register circuit 13. Such steering circuits are known in the art, as exemplified by the Patent 2,468,300 which issued to M. E. Maloney et al. on April 26, 1947. The plurality of transverters 16 are connected in a lockout arrangement so that the transverter requests for translation are on a one-at-a-time basis.

The register circuit 13 comprises a plurality of devices 80A through 80J, 81A through 81J, etc. which may be thyratron tubes. Each of the devices or tubes 80A–J, 81A–J, etc. is individually connected to the output of one of the photocells 90A to 90J, 91A to 91J, etc., which are in the reading head 19. The reading head 19 functions in a similar manner as the reading head 18, described above. The holes punched in the tape 20 pass adjacent the head 19 and represent the directory number associated with the related equipment number punched on the tape 20 which passes adjacent head 18. The output indications provided from the head 19 are utilized to enable the register tubes 80A–J, 81A–J, etc. There are forty-four photocells 80A–J, 90A–J, etc. in the reading head 19; forty for determining the directory number and four for determining the class of service. The arrangement of the photocells is in accordance with the hole positions on tape 20, as shown in Fig. 2. The arrangement and number of holes is, of course, not restrictive but merely illustrative.

When a match occurs in the matching circuit 15, an operating potential is provided through the steering circuit 47 to each of forty-four tubes 80A–J, 81A–J, etc. Five of the tubes 80A–J, 81A–J, etc. have been selectively enabled by the head 19 when the operating potential is received from circuit 15. When the operating potential is received, the five enabled ones of tubes 80A–J, 81A–J, etc. are energized. In this manner, an indication of the directory number which is perforated on the tape 20 is provided by the register circuit 13 back to the transverter 16. The output leads from the register circuit 13 are designated U0–9, T0–9, H0–9, TH0–9 and CL0–3, with only the units leads U0 and U9 and the thousands leads TH0 and TH9 being shown. The potentials on these output leads from the register circuit 13 indicate the condition of the tubes 80A–J, 81A–J, etc. and therefore the thousands, hundreds, tens and units digit of the calling subscriber director number and his class of service. When the operating potential is removed from the amplifier 46, the energized or triggered ones of tubes 80A–J, 81A–J, etc. extinguish. After the director number from the register circuit 13 is provided to the transverter 16, the transverter 16 disconnects the potentials supplied to the input leads to the matching circuit 15. The translator 9 is thereupon ready for further use by another transverter 16.

To summarize, and as an illustrative example of the operation of the translator 9 of the present invention, assume that a calling subscriber has a line link location in the office designated by frame tens digit 1, frame units digit 4, vertical group 2, horizontal group 3, vertical file 3 and that his party station number is 2. The input, therefore, from the transverter 16 is in the form of a potential which appears on the corresponding lead in each of the subgroup of input leads FT, VF, FU, HG, VG and RC from the transverter 16. The instant these potentials appear on the input leads from the transverter 16, the translator 9 commences hunting for the corresponding perforations on the tape 20. The tape 20 is continuously rotated adjacent to the reading heads 18 and 19. Although the reading process due to the rotation of tape 20 is going on continuously, there is no output from the matching circuit 15 until input potentials are provided from a transverter 16. As illustrated in Fig. 2, when the match occurs, a directory number having a thousands digit of 2, a hundreds digit of 3, a tens digit of 9 and a units digit of 5, and a class of service of 3 is provided back to the transverter 16.

As described above in the general description, the translator 9 also performs a number group function utilizing the same tape 20 which is used for providing the translation from an equipment number to a directory number.

Figure 5:
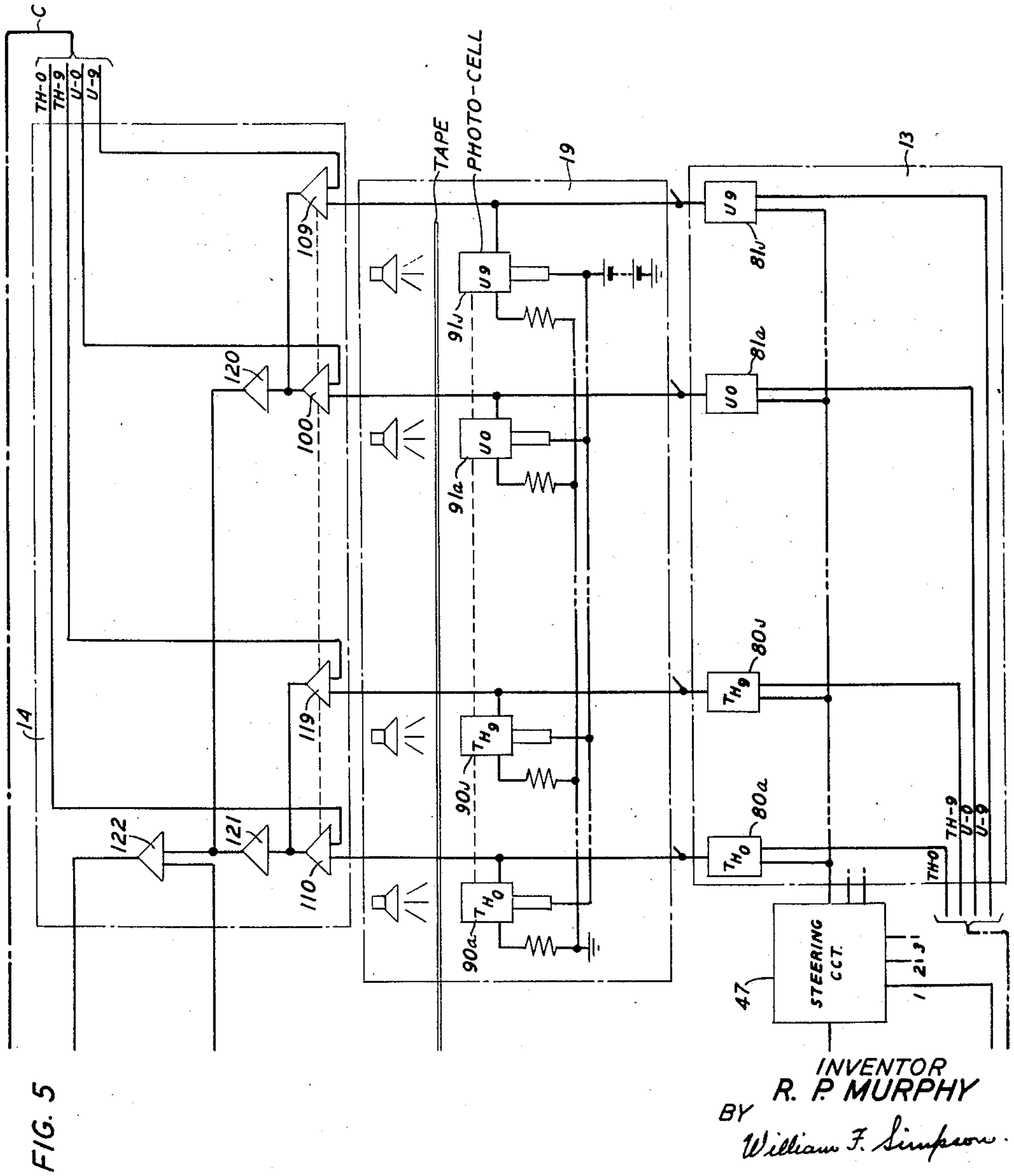

During the process of setting up a call, a marker 10 receives the called subscriber's directory number and must obtain the associated equipment number. There is no uniform relation between the directory number of a line and the terminals in the office to which it is connected. The marker 10 provides potentials upon selected ones of forty-four input leads to the directory number matching circuit 14. These leads are designated TH0–9, H0–9, T0–9, U0–9 and CL0–3 and are connected through the cable C to the matching circuit 14. Only four of these forty-four leads are shown in Fig. 5; TH0, TH9, U0 and U9. When a translation is desired, the marker 10 provides a potential to one lead of each group of leads to indicate the called subscriber's directory number. The present invention is, however, not restricted to a coding on a one-out-of-ten basis as any other coding system may be utilized. Each of the input leads from the marker 10 forms one of two inputs to one of forty-four coincidence amplifiers, 100 through 119, etc. The other set of input leads to the forty-four coincidence amplifiers, 100 through 119, etc. is connected from the photocells 90A–J, 91A–J, etc. of the reading head 19. Each group of amplifiers, as for example the group of amplifiers 100 through 109, is connected to one of the control amplifiers 120, 121, etc. Since here there are five groups of coincidence amplifiers, there are five amplifiers 120, 121, etc. The amplifiers 120, 121, etc. control one input of the output amplifier 122 and the other input is connected to the synchronizing signal photocell 75 described above.

The matching circuit 14 operates in a manner similar to that of the matching circuit 15, described above, to indicate the occurrence of a match between the coded signals provided from the marker 10 and the reading head 19. When a match occurs, an output indication is provided from the amplifier 122 through the steering circuit 123 to the operate lead of the triggering devices 130 through 133, 140 through 144, etc. in the register circuit 12. Selected ones of the triggering devices 130 through 133, 140 through 144, etc. are enabled by the photocells 60 through 63, 70 through 74, etc. in the reading head 18. The operation of the matching circuit 14 provides the operating potential causing the enabled ones of the triggering devices 130 through 133, 140 through 144, etc. to provide an output from the register circuit 12 back to the marker 10. The output leads from the register circuit 12 are extended to register relays in the marker 10 causing selected ones thereof to operate and register the equipment number of a called subscriber's line.

The steering circuit 123 is similar to the steering circuit 47, described above, in allowing for the provision of as many register circuits 12 as there are markers 10 to reduce the holding time of the common equipment of the translator 9. The markers 10 are connected in a conventional lockout or preference arrangement so that only one marker 10 at a time can provide an input to the matching circuit 14. The markers 10 and transverters 16, however, are not interconnected in a cross-lockout arrangement so that one marker 10 and one transverter 16 can simultaneously provide inputs to the matching circuits 14 and 15, respectively.

Assume that a marker 10 and a transverter 16 simultaneously supply inputs to the matching circuits 14 and 15, respectively. The continuously rotating tape 20 will provide a match for one and then the other depending upon the random arrangement of the digital information on the tape 20. Even if the equipment number provided by the transverter 16 could be the equipment number corresponding to the directory number simultaneously provided by the marker 10, the translator 9 operates satisfactorily and simultaneously provides the required translations.

When changes are required to be made in the translation information perforated on the tape, a new tape can be readily made from the old tape. The old tape and a change-indicating tape are positioned adjacent a first and a second reader, not shown, which read the tapes and provide the information to a matching circuit, also not shown. The matching circuit compares the readings and controls a recorder which is positioned adjacent the new tape through a transfer circuit. Neither the transfer circuit nor the recorder are shown. If the readings are dissimilar, the transfer circuit remains normal and allows the first reader adjacent the old tape to control the recorder and perforate the new tape in accordance with the reading of the old tape. When the two readings are similar or match, the matching circuit operates the transfer circuit which disconnects the first reader and connects the second reader to the recorder. The recorder thereupon perforates the new tape in accordance with the reading of the change-indicating tape. The change-indicating tape is thereupon automatically stepped and the procedure continues until a new tape is produced having all of the changes incorporated therein.

The present invention is not restricted to the illustrative embodiment described herein. For example, the scanning or reading heads may utilize printed tapes, magnetic methods, capacitive discrimination methods, etc.

Numerous other arrangements may be devised by those skilled in the art without departing from the spirit and scope of the invention. For example, the present invention is not restricted to the use of two sets of information as any number of sets may be utilized. One common illustrative example could be associating the angle with its several trigonometric functions. It is to be understood that the above-described arrangement is therefore only illustrative of the application of the principles of the invention.

What is claimed is:

1. A two-way translator comprising a continuous tape having a longitudinally arranged first and corresponding second set of information perforations; a first and a second photoelectric reading head positioned adjacent said tape for said first and said second set, respectively; means for providing a relative motion between said tape and said reading heads such that said heads read corresponding information at the same time; a first and a second translation requesting input circuits adapted to operate simultaneously; a first matching circuit jointly controlled by said first reading head and said first input circuit; a second matching circuit jointly controlled by said second reading head and said second input circuit; a first register circuit enabled by said second reading head and operated under control of said first matching circuit to supply to said first input circuit an indication of the information read by said second head; and a second register circuit enabled by said first reading head and operated under control of said second matching circuit to supply to said second input circuit an indication of the information read by said first reading head.

2. A two-way translation system comprising a tape having two corresponding sets of information; a first means for sequentially and continuously providing from said tape indications of corresponding portions of each of said sets of information; selecting means for supplying input signals identical to a portion of either of said sets of translation information; a second means enabled by said selecting means and operated by said first means upon provision of an indication of the portion of said other set corresponding to said input signals; and a third means enabled by said first means and responsive to the operation of said second means for providing an output of the said portion of said other set.

3. A two-way translator comprising two sets of selecting means for simultaneously initiating translation requests; an information medium having corresponding sets of translation information; matching means associated with each of said sets and jointly controlled by one of said selecting means and by a portion of one of said sets of translation information; and register means jointly controlled by said matching means and the other of said sets of translation information for sequentially providing indications of corresponding portions of said sets of translation information.

4. A two-way translation system comprising a tape having two corresponding sets of translation information; a first means for sequentially and continuously providing from said tape signals identifying portions of each of said sets; selecting means for supplying signals identical to a portion of one of said sets; matching means for providing indications of matches between said signals supplied by said selecting means and provided by said first means; and register means enabled by said first means and responsive upon a matching indication from said matching means for providing output indications identifying those portions of said sets corresponding to other portions of said sets in turn identified by said signals providing for the operation of said matching means.

5. A two-way translation system comprising a tape having two corresponding sets of translation information, a first means for sequentially and continuously providing from said tape signals identifying portions of each of said sets, selecting means for supplying signals identical to a portion of one of said sets, matching means for providing indications of matches between said signals supplied by said selecting means and provided by said first means, register means enabled by said first means and responsive upon a matching indication from said matching means for providing output indications identifying those portions of said sets corresponding to other portions of said sets in turn identified by said signals providing for the operation of said matching means, and in addition means for sequentially operating said matching means in response to the simultaneous provision by said selecting means of said signals identical to a portion of each of said sets of information.

6. A two-way translator comprising a continuous perforated tape having a longitudinally arranged first and corresponding second set of groups of information perforations; a first and a second photoelectric reading head continuously sensing and positioned respectively adjacent said first and said second sets; synchronizing means; means for providing a continuous relative motion between said tape and said reading heads such that said heads read respective corresponding information at the same time; a first and a second input circuit; a first matching circuit jointly controlled by said first reading head and said first input circuit; a second matching circuit jointly controlled by said second reading head and said second input circuit, each of said matching circuits comprising a plurality of groups of coincidence amplifiers having one input connected to one of said first and second heads and one input connected to one of said first and second input circuits respectively, a control amplifier for each of said groups of coincidence amplifiers responsive to the operation of any one of said coincidence amplifiers in said group, and an output coincidence amplifier having one input multipled to said control amplifiers and a second input connected to said synchronizing means; a first register circuit comprising a plurality of triggering devices, each of said triggering devices having an enabling lead connected to said second reading head and an operate lead connected to said output coincidence amplifier in said first matching circuit; a second register circuit comprising a plurality of triggering devices, each of said triggering devices in said second register circuit having an enabling lead connected to said first reading head and an operate lead connected to said output coincidence amplifier in said second matching circuit.

References Cited in the file of this patent

UNITED STATES PATENTS

| | | |
|---|---|---|
| 2,594,358 | Shaw | Apr. 29, 1952 |
| 2,597,866 | Gridley | May 27, 1952 |
| 2,628,346 | Burkhart | Feb. 10, 1953 |
| 2,633,498 | Schneckloth | Mar. 31, 1953 |
| 2,657,272 | Dimond | Oct. 27, 1953 |
| 2,721,990 | McNaney | Oct. 25, 1955 |